July 22, 1930.   R. B. MILLER   1,771,227
WHEEL RIM
Filed Nov. 12, 1925
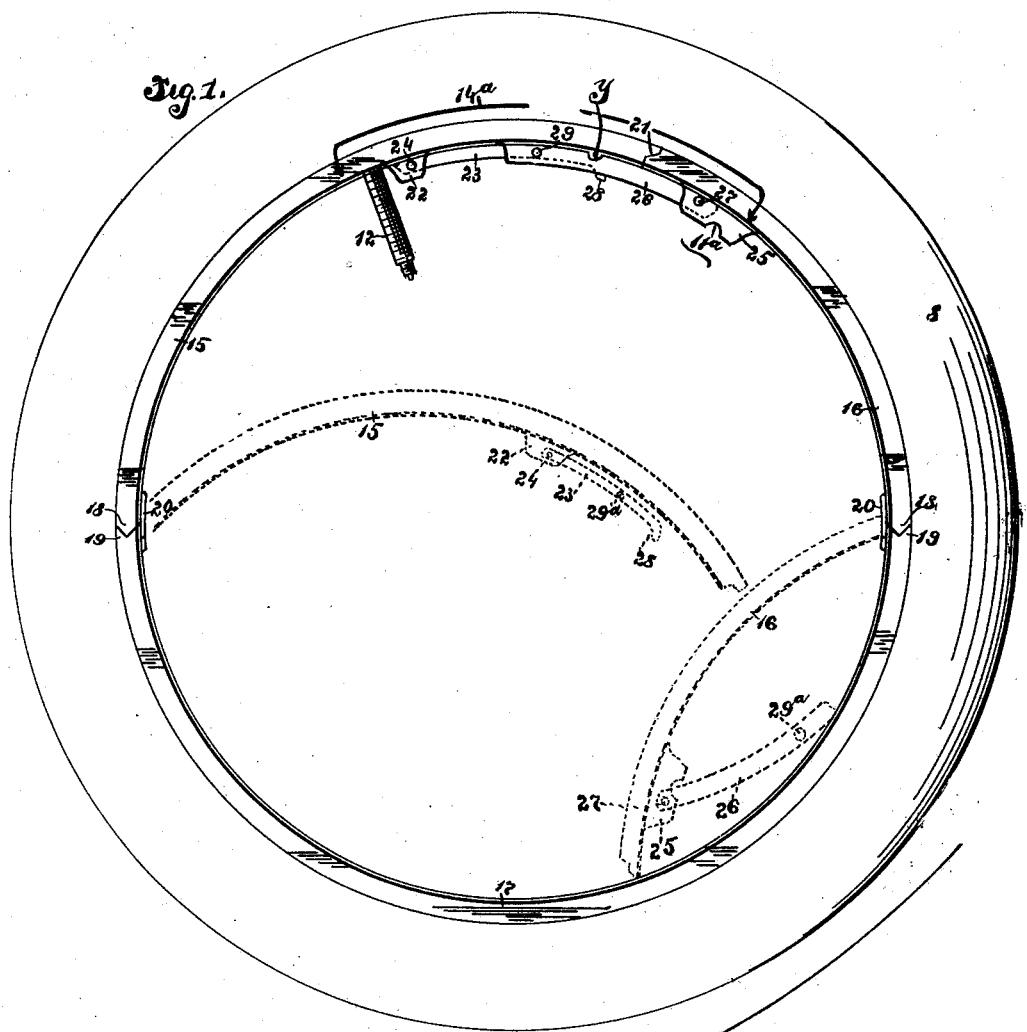
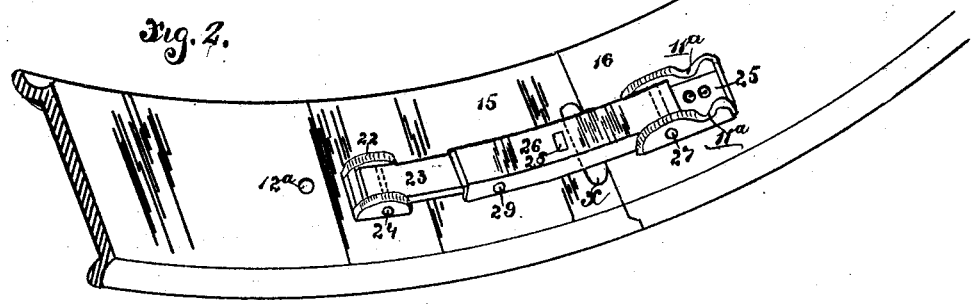
Inventor
Richard B. Miller Patented July 22, 1930

1,771,227

UNITED STATES PATENT OFFICE

RICHARD B. MILLER, OF BROOKLYN, NEW YORK, ASSIGNOR TO R. E. H. INCORPORATED, A CORPORATION OF NEW YORK

WHEEL RIM

Application filed November 12, 1925. Serial No. 68,707½

The present invention relates to demountable tire carrying rims of the type which are made collapsible within the tire and has for an object to provide an improved rim of this type.

The nature and objects of the invention will be better understood from a description of a particular illustrative embodiment for the purposes of which description reference should be had to the accompanying drawings forming a part hereof and in which—

Figure 1 is a view in side elevation of a rim constructed in accordance with the invention in position within a tire, the dotted outline of parts showing the sections in collapsed relation, and Figure 2 is a detail perspective view of the toggle locking mechanism which holds the free ends of the rim sections in alined relation.

The rim shown for the purpose of illustrating the invention is provided with an easily operated mechanism for collapsing and expanding the rim within the tire to facilitate removal and replacement. In the construction shown the common channel rim is shown with the tire 8 thereon, the rim comprising the sections 15, 16 and 17 having at their meeting ends interengaging projections and recesses 18, 19 formed on the rim flanges to hold the same in accurately alined position, joint plates 20 completing the hinge joints. The free ends of the rim flanges of the sections 15 and 16 are cut at an angle and stepped to form a close fitting joint, as indicated at 21, and the bases of the rim sections are formed with an interlocking tongue and recess $x$, as indicated in Fig. 2.

On the inner periphery of the free end of the section 15 at a point spaced substantially from the end thereof a bracket 22 is secured and to it a toggle link 23 is pivoted at 24. Another bracket 25 is attached to the inner face of the rim section 16 but nearer to the end thereof and to it a toggle member 26 is pivoted at 27. The toggle members 23 and 26 are confined within the side flanges of the brackets 22 and 25 and interengage, the member 23 being provided at its end with a tongue 28 engageable with an aperture in the toggle member 26, as best indicated in Fig. 2. The member 26 is formed with side flanges which overlie the sides of the member 23 to provide a rigid structure and toward the end of the member 26 apertures are provided in the two links to receive a cotter pin 29 to lock the members in interengaging relation.

The toggle members are operable to expand the rim within the tire and to hold the rim ends locked in alined relation. The toggle members overlap for a considerable distance and are confined one within the other to form a rigid locking arrangement.

The bracket 25 is formed with notches 11$^a$ for engagement with the fixed bolts of the wheel rim to form a positive driving action between the wheel and rim.

The foregoing particular description is illustrative merely and is not intended as defining the limits of the invention.

What I claim is—

A demountable sectional rim comprising a plurality of hingedly connected sections, a toggle mechanism connecting the abutting ends of two of said sections operative to force said sections into alined relation within a tire and operative to hold said sections locked in alined relation comprising toggle links, one connected to each section, one of said toggle links being of channel form and the other being shaped to fit therein and pivoted thereto, and a locking pin extending transversely through the channel shaped link and the inner link to lock the same in alined relation.

RICHARD B. MILLER.